United States Patent [19]

Oyama

[11] 4,092,802

[45] June 6, 1978

[54] SPROUTER FOR HOME USE WITH AUTOMATIC IRRIGATOR

[76] Inventor: George Clement Oyama, 9, Shiba, Nishi-Kubo Shiroyama-cho, Minato-ku, Tokyo, Japan

[21] Appl. No.: 766,521

[22] Filed: Feb. 7, 1977

[51] Int. Cl.² .......................................... A01G 31/00
[52] U.S. Cl. ............................................. 47/16; 47/60
[58] Field of Search .................. 47/14, 16, 60, 61, 62; 137/416, 397

[56] References Cited

U.S. PATENT DOCUMENTS

| 3,848,358 | 11/1974 | Messmer | 47/69 |
| 3,943,658 | 3/1976 | Hai | 47/16 X |
| 3,993,090 | 11/1976 | Hankison | 137/416 X |

Primary Examiner—Ronald E. Suter
Attorney, Agent, or Firm—James R. Cypher

[57] ABSTRACT

A device for producing sprouts consisting of a receptacle for containing the growing sprouts having a drain therein and a water reservoir method above the first receptacle. The water reservoir is filled at a slow regulated rate and is automatically emptied into the first receptacle at regular intervals. Heater means raises the reservoir water to the desired temperature and the entire assembly is contained within an insulated housing for maintaining a nearly constant temperature and providing a dark environment.

2 Claims, 15 Drawing Figures

SPROUTER FOR HOME USE WITH AUTOMATIC IRRIGATOR

BACKGROUND OF THE INVENTION

The growing of sprouts in small quantities for home use has become a popular hobby. They can be grown in an apparatus as simple as a glass jar with a cheese cloth cover or in one of several devices some of which are mentioned below. Since the sprouts must be rinsed with water several times during the growing cycle, the apparatus provided to accomplish this function is the key to the success of the device.

Richards, U.S. Pat. No. 2,084,005 provided a ball cock valve connected to a pressure water system. Widmann, U.S. Pat. No. 2,121,461 used a siphon system to automatically empty his reservoir at regular intervals. Lund, U.S. Pat. No. 2,169,701 emptied a reservoir using a special ball float valve and lever system. Yoo, U.S. Pat. No. 3,768,201 turned on a spray system from a pressure water system at timed intervals using timer switches. Mun, U.S. Pat. No. 3,616,560 actuated a valve by means of a vertical float switch which was connected to a pressure water system.

SUMMARY OF THE INVENTION

The gist of the present invention is the provision of an apparatus which can reliably supply rinsing water to growing sprouts yet is inexpensive to construct and to operate.

A further object is to provide an apparatus which will release water over the sprouts periodically without the need for expensive electrical timers or expensive float apparatus valves.

Still another object is to provide a novel construction in which the amount of air flow to the apparatus may be manually regulated.

BRIEF DESCRIPTION OF THE INVENTION

Figure 1:
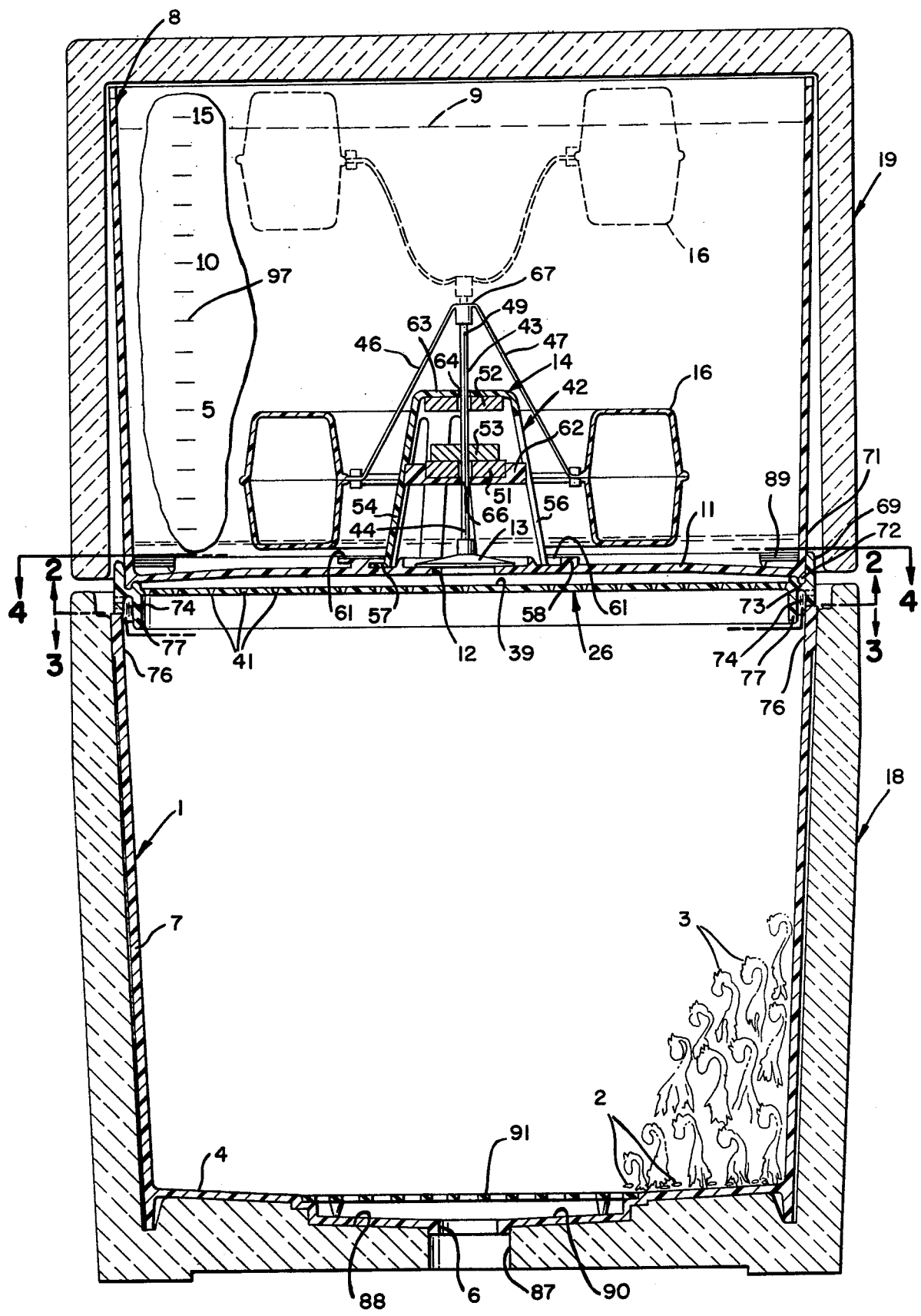
FIG. 1 is a cross sectional view of the apparatus of the present invention. Portions of the valve mechanism are shown in phantom line to indicate different positions of the apparatus for different water levels in the reservoir.

Referring to the drawings, the apparatus of the present invention consists of a first container 1 for retaining a supply of seeds 2 and for growing sprouts 3 therein having a base 4 formed with a drain opening 6 for passing water and retaining the beans and sprouts and upstanding sidewalls 7 for retaining the sprouts and an intermittent supply of water.

A second container 8 is removably mounted above the first container for temporarily retaining a supply of water 9 and has a base 11 formed with a drain opening 12 for discharging water into the first container.

A valve 13 is mounted in the second container selectively covering the discharge opening 12 in a first position and uncovering the discharge opening in a second position.

A valve operating means 14 is mounted in the second container operatively connected to the valve and includes a float 16 responsive to the water level in the second container for quickly opening the valve with a snap-action at a pre-selected upper elevation of the float and quickly closing the valve with a snap-action at a lower pre-selected elevation of the float.

A water inlet regulating means 17 slowly supplies water to the second container at a pre-selected rate. To permit the water to be warmed to the desired temperature either by room temperature or by an electrical heater.

Since the growing of sprouts requires a dark environment, it is preferable to use an opaque enclosure means for shielding light from the seeds and sprouts. This may include a bottom container 18 and top container 19 which is described below.

Where temperatures of the growing room may vary, it is preferable to enclose the containers in a thermal insulating means here shown as bottom and top containers 18 and 19. Styrofoam or other plastic materials make a suitable thermal insulating container.

The device should be provided with means to regulate the ingress and egress of air to and from the first container. One example of a means for regulating the air is to form the upper edge of the upstanding sidewalls of the first container with repeating stepped lands 21, 22, 23 and 24 positioned at a plurality of elevations. A ring member 26 is positioned between the first and second containers and is formed with mating repeating stepped lands 27, 28, 29 and 30 positioned at a plurality of elevations for raising the second container above the first container at selected varying elevations depending upon selected relative rotational positions of the first container and the ring member.

Figure 10A:
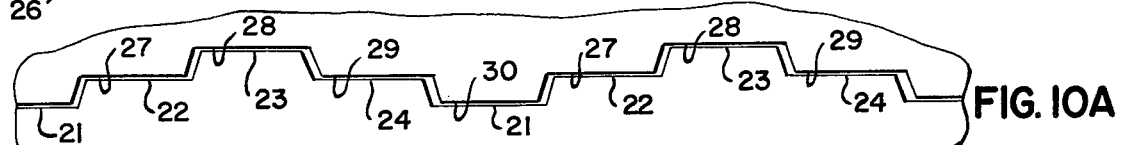
FIG. 10A is a greatly enlarged side view of a portion of the circumference of the container for regulating the amount of air to the growing sprouts. The device is in the closed position.
Figure 10B:
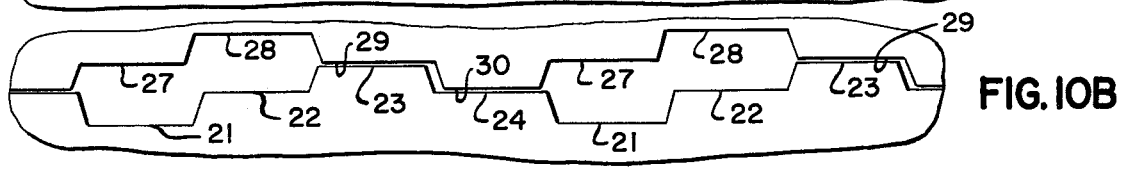
FIG. 10B is a side view as shown in FIG. 10A in which the device is partially open for the admission of air.
Figure 10C:
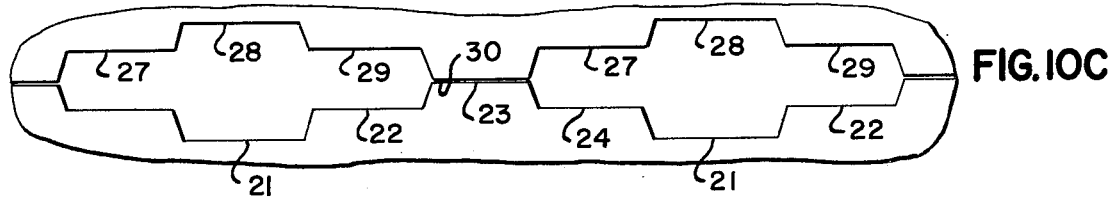
FIG. 10C is a side view of the portion of the device shown in FIG. 10A with the apparatus in the fully opened position.

FIG. 10A shows the relative positions of the ring and first container for cutting off the flow of air to and from the first container. FIG. 10B shows the relative positions for partial flow of air and FIG. 10C shows the positions of the first container and ring for maximum air flow.

Figure 11A:
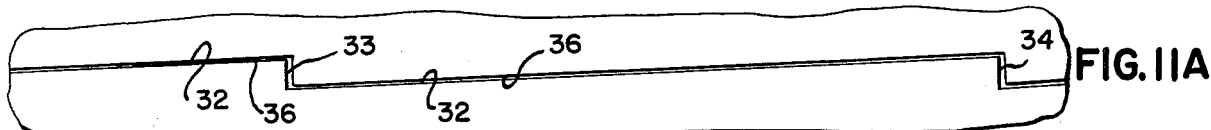
FIG. 11A is an alternate device for the admission of air to the growing sprouts and is a side view of a portion of the circumference of the housing. The device is in the closed position.
Figure 11B:
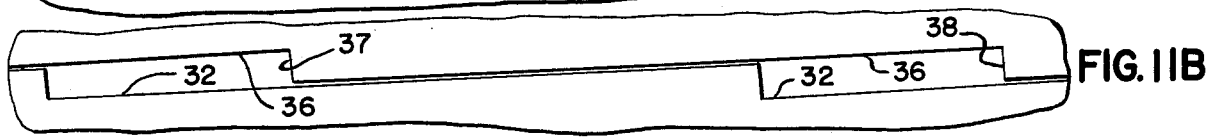
FIG. 11B shows the portion of the device of FIG. 11A in the partially open position.
Figure 11C:
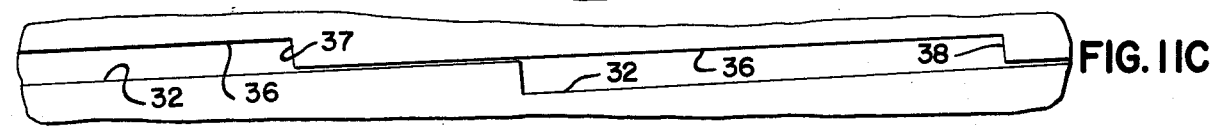
FIG. 11C shows the portion of the device of FIG. 11A in the fully open position.

FIGS. 11A, 11B and 11C shows an alternate method of regulating the air to the first container. The upper end of the first container is formed with a plurality of inclined edges 32 between vertical edges 33 and 34. The ring 26 is formed with mating slanting edges 36 between vertical edges 37 and 38. FIG. 11A shows the position of the container and the ring in the closed position. FIG. 11B shows the respective position of the parts in the partially open position, and FIG. 11C shows the position of the container and ring in the nearly full open position.

Preferably the apparatus includes a water regulating means for regulating the rate of flow of water from the second container to the first container and for uniformly distributing the flow of water to the entire surface area of the first container. Merely dumping the water onto the growing sprouts would disturb the orientation of the sprouts; resulting in crooked sprouts as the growing sprout tried to reorient itself so as to grow vertically. It has been found that by not disturbing the orientation of the sprouts, less energy is used by the sprout which is permitted to grow perfectly straight. Thus, the energy is permitted to be directed to growing longer. Preferably, the means is merely a flat surface 39 formed with openings 41. To evenly distribute the water, the density and number of openings is greater at the periphery than in the center portion of the surface. Surface 39 is incorporated in ring 26 which is more specifically described below.

Figure 7:
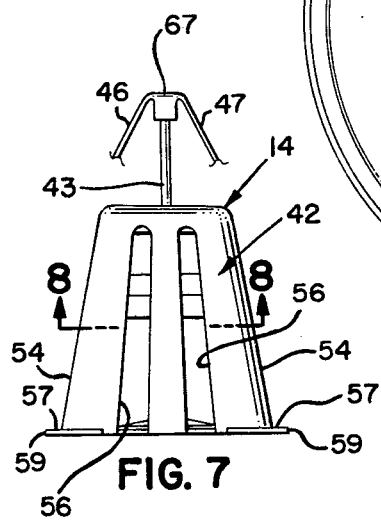
FIG. 7 is a side view of a portion of the valve system.
Figure 8:
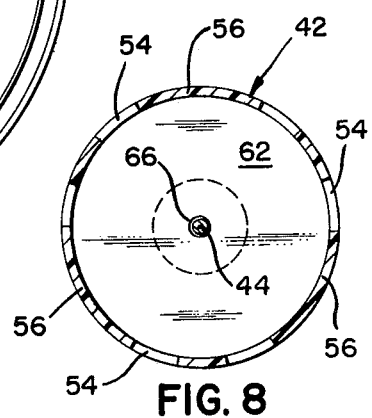
FIG. 8 is a cross sectional view taken along line 8—8 of FIG. 7.
Figure 5:
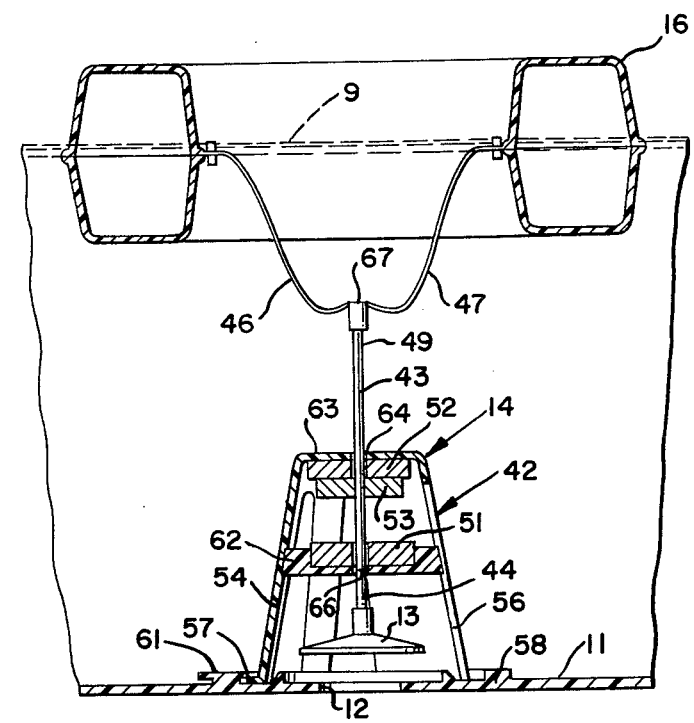
FIG. 5 is a cross section of a portion of the device of FIG. 1 showing the valve in the open position and the reservoir full of water.
Figure 9:
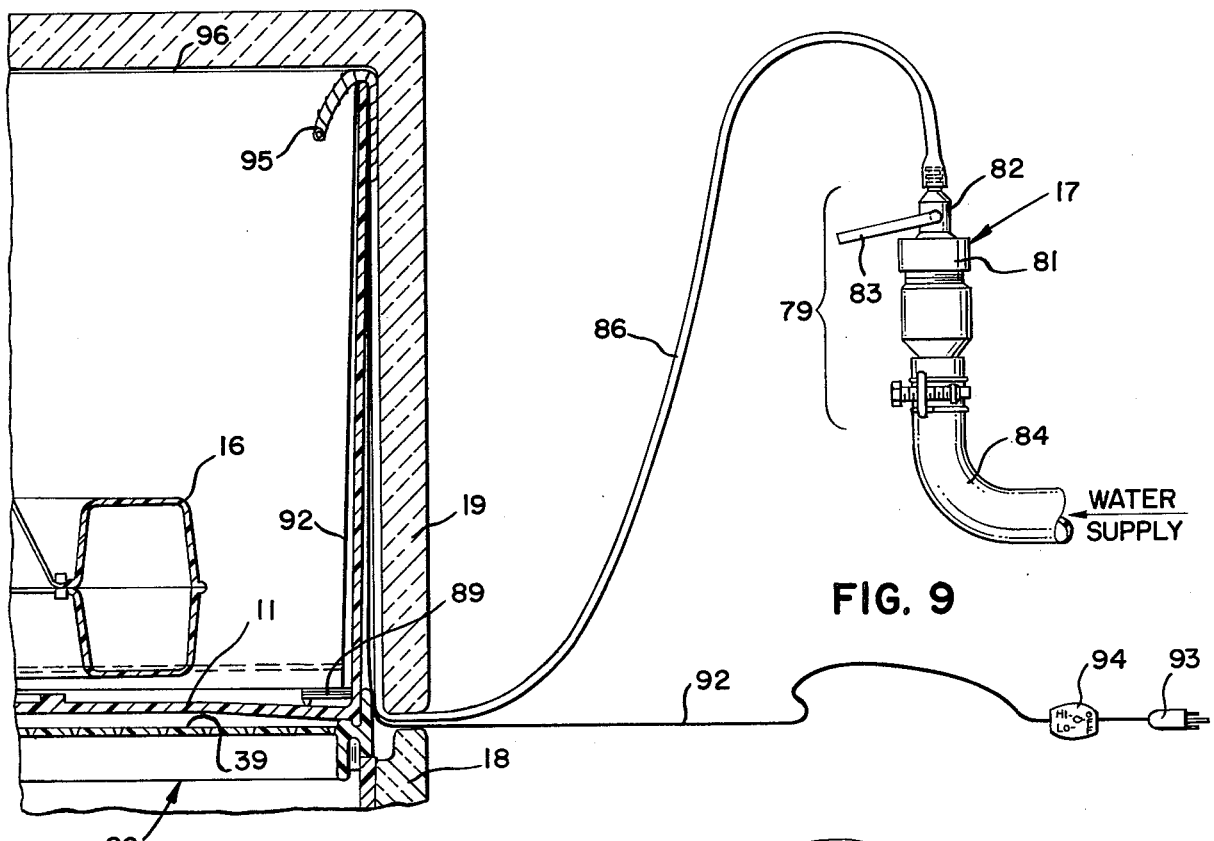
FIG. 9 is a side view of the water regulator and a partial cross sectional view of a portion of the apparatus of FIG. 1.

In the preferred form of the invention, a valve holding means is mounted in the second container for holding the valve in communication with the discharge opening until the float reaches a pre-selected upper elevation and holds the valve out of communication with the discharge opening until the float returns to a pre-selected lower elevation. Referring to FIGS. 1, 5 and 7, the valve holding means includes a valve housing 42 mounted in the second container, and a shaft 43 mounted for reciprocation in the valve housing. The valve is connected to a first end 44 of the shaft and flexible lines 46, 47 and 48 are connected to second end 49 of the shaft and to the float member 16. A first magnetic member 51 is rigidly positioned in the housing at a first lower elevation. A second magnetic member 52 is rigidly positioned in the housing at a second elevation position. A third magnetic member 53 is connected to the reciprocating shaft and is movable therewith into a first magnetic coupled position with the first magnet and to a second magnetic coupled position with the second magnet.

As illustrated in FIGS. 1, 5, 6, 7 and 8 the valve housing may be a tower-like member, circular in cross section and formed with legs 54 having openings 56 therebetween for the flow of water therethrough. Flanges 57 are connected to the bottom portions of at least three of the legs. The bottom of the second container is formed with an annular raised ring 58 which mates with the outer edges 59 of the flanges to center the valve housing. Inturned flanges 61 attached to the annular ring hold the flanges to the bottom of the container. By spacing the flanges on the valve housing and the inturned flanges on the annular ring, it is possible to remove and replace the valve housing by simply rotating the valve housing.

The valve housing is formed with a first platform 62 which is connected to the legs of the housing above the bottom of the container. The first magnet is rigidly mounted on the platform. The upper portion of the housing is formed with an upper platform 63 and the second magnet is attached thereto. An opening 64 is formed in the upper platform and an opening 66 is formed in the second magnet to permit the passage of the shaft therethrough. The openings in the first and second platforms center the shaft 43.

The valve 13 is preferably a soft rubber or plastic disc dimensioned to cover opening 12 in the container. The valve is placed on the shaft so that as the valve closes, it can cushion the shock of the magnets slamming against each other.

The float member 16 is preferably an annular doughnut-like hollow plastic member which surrounds the valve housing. The float may also be made from any buoyant material in which the buoyancy of the member is calculated to overcome the attraction force between the first and third magnets to open the valve at a preselected water elevation and has a weight sufficient to overcome the attraction of the second and third magnets to close the valve.

In order to permit the second container to fill with water before the valve is opened, the float is connected to the top of the shaft by a connector 67 and by at least three flexible lines which have a length sufficient to permit the float to rise to the position illustrated in FIG. 1 in phantom line. These lines may be made of plastic or other material which is flexible yet will not elongate or stretch under the working conditions of the unit. All of the magnets are preferably discs with flat mating surfaces and the strength of the magnets is calculated to permit release of the magnets at the proper times against the force of the buoyant float member.

The cross sectional shape of ring 26 is illustrated in FIG. 1. The outer rim is formed with an upstanding flange 69 which is dimensioned to slidably receive the outer wall 71 of the second container. Preferably the second container is formed with a downwardly depending rim 72 which is slidably received in annular depression 73 formed in the ring.

In order to position the ring on the upper edge of the first container, a plurality of depending bosses 74 are formed in the lower side of the ring and are positioned for sliding engagement with the upper inside edge 76 of the first container. For rigidity a flange 77 is formed on the lower side of the ring near the perimeter but inside the bosses 74.

Figure 2:
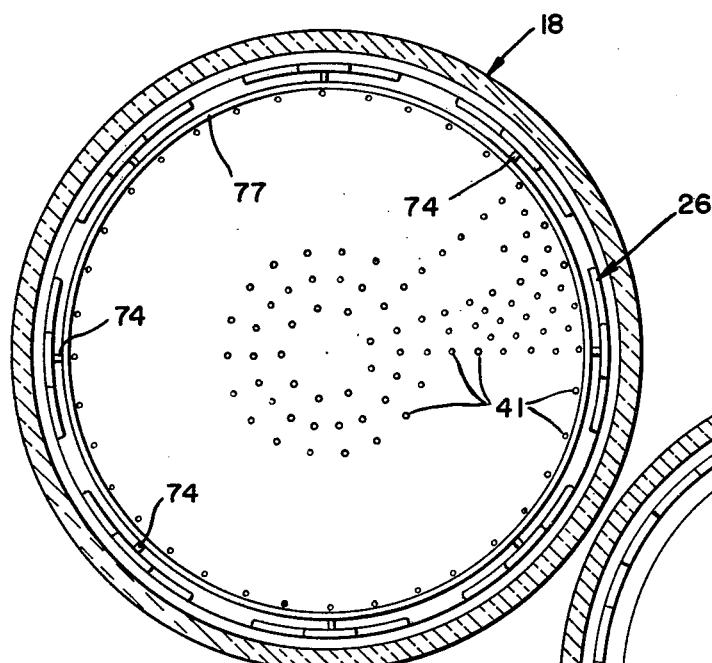
FIG. 2 is a cross sectional view of the device taken along line 2—2 of FIG. 1.
Figure 3:
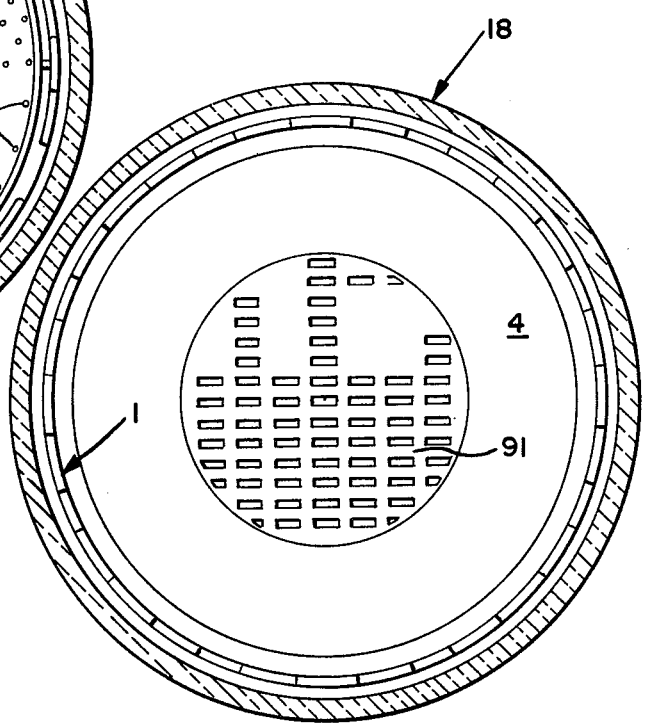
FIG. 3 is a cross section of the device taken along line 3—3 of FIG. 1.
Figure 4:
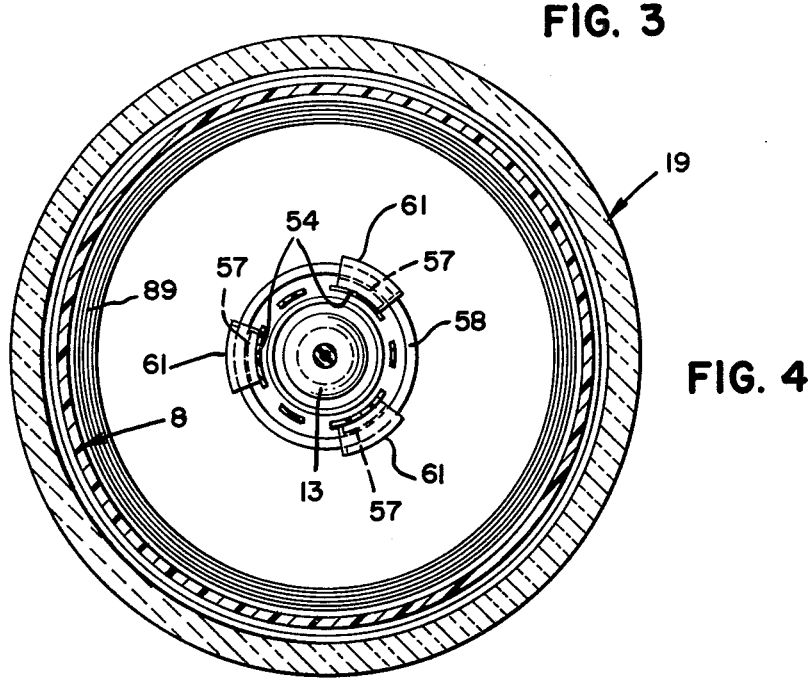
FIG. 4 is a cross section of the device taken along line 4—4 of FIG. 1.
Figure 6:
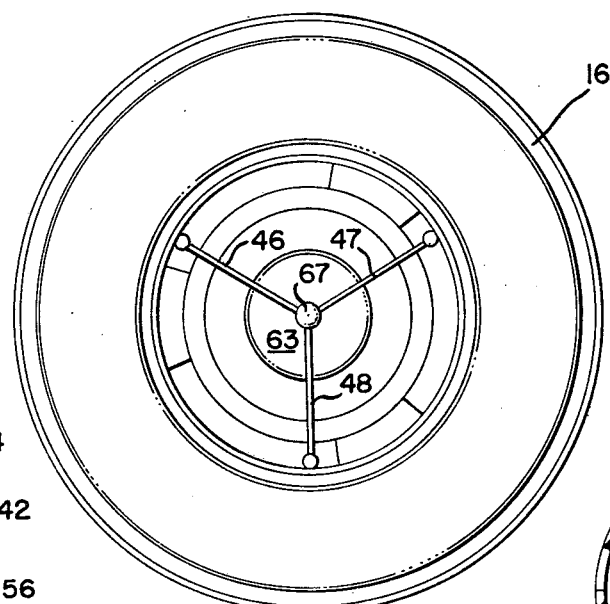
FIG. 6 is a top plan view of the float and valve device.

As illustrated in FIG. 2, the ring is formed with a plurality of openings to pass the water and spread it over the entire face. The water may be spread evenly by placing less openings in the center portion than in the outer portions.

The water regulator means 79 includes a pipe reducer 81 and a valve 82 operated by a manually engageable handle 83 to vary the opening of the valve. A length of large diameter plastic pipe 84 may be used to connect to a water faucet. Water is supplied to the container through small plastic pipe 86.

In order to keep the beans and sprouts at the proper temperature, a styrofoam or other insulating material is formed in the shape of a container 18 having a bottom formed with an opening 87 and a recessed area 88. A second insulator cover 19 is formed to cover the second container. The insulated cover and container completely cover the inner containers except for an open space near the ring member to permit air to circulate into the inner containers.

To further provide the proper temperature, in cooler climates, a heating element 89 is provided which may be an annular ring and fit along the outer lower edge of the second container. In order to prevent burnout of the heating element, the upper container should be formed with a depression or a bottom which slopes to the outside so that there will always be some water left in the second container.

The water in the first container should be completely drained after each rinsing and the bottom of the first container should be slanted toward the central depressed area 90. The depressed area may be covered with a screen 91 to prevent passage of the beans and sprouts out of the container.

The operation of the sprouter device is as follows:

A layer of beans is placed evenly on the bottom surface of the first container. The container is then placed inside the bottom insulated container 18 and ring 26 is placed on top of the first container. The second container is then placed above the ring with the valve operating means 14 secured in place with the valve 13 covering opening 12. If needed, the heating element 89 is placed in the bottom of the second container. A wire cord 92 attached to electrical plug 93 is connected to an electrical socket and the switch 94 turned on when there is some water in the second container. Tube 86 with its discharge end 95 is placed over the top edge 96 of the second container. The ring 26 is then rotated in relation to the first container until the desired air openings are selected. The top cover 19 is then placed over the second container. Hose 84 is then connected to a water supply such as a sink faucet and lever 83 is rotated until the proper rate of flow is obtained. Appropriate markings 97 are placed on the second container so that the rate of flow can be timed and the valve adjusted according to a written manual. The proper flow rate should be determined before the assembly of the apparatus. The apparatus should then be placed in a sink or other place where the rinsing water may be drained away from the container. After several hours, the ring may be rotated to adjust the air flow to the growing bean sprouts.

After the required number of growing days, the apparatus may be disassembled and the sprouts removed from the container.

I claim:

1. An apparatus for growing sprouts comprising:
   a. a first container for retaining a supply of seeds and for growing sprouts therein having a base formed with a drain opening for passing water and retaining said beans and sprouts and upstanding sidewalls for retaining said sprouts and an intermittent supply of water;
   b. a second container removably mounted above said first container for retaining a supply of water having a base formed with a drain opening for discharging water into said first container;
   c. a valve mounted in said second container selectively covering said discharge opening a first position and uncovering said discharge opening, in a second position;
   d. valve operating means mounted in said second container operatively connected to said valve and including a float responsive to the water level in said second container for opening said valve at a pre-selected upper elevation and closing said valve at a lower pre-selected elevation;
   e. water inlet regulating means for supplying water to said second container at a pre-selected rate;
   f. means regulating the ingress and egress of air to and from said first container; and
   g. said air regulating means includes;
      1. the upper edge of said upstanding sidewalls of said first container is formed with repeating stepped lands positioned at a plurality of elevations; and
      2. a ring member positioned between said first and second containers formed with mating repeating stepped lands positioned at a plurality of elevations for raising said second container above said first container at selected varying elevations depending upon selected relative rotational positions of said first container and said ring member.

2. An apparatus for growing sprouts comprising:
   a. a first container for retaining a supply of seeds and for growing sprouts therein having a base formed with a drain opening for passing water and retaining said beans and sprouts and upstanding sidewalls for retaining said sprouts and an intermittent supply of water;
   b. a second container removably mounted above said first container for retaining a supply of water having a base formed with a drain opening for discharging water into said first container;
   c. a valve mounted in said second container selectively covering said discharge opening in a first position and uncovering said discharge opening, in a second position;
   d. valve operating means mounted in said second container operatively connected to said valve and including a float responsive to the water level in said second container for opening said valve at a pre-selected upper elevation and closing said valve at a lower pre-selected elevation;
   e. water inlet regulating means for supplying water to said second container at a pre-selected rate;
   f. means regulating the ingress and egress of air to and from said first container; and
   g. said air regulating means includes:
      1. The upper edge of said upstanding sidewalls of said first container is formed with repeating inclined steps and generally vertical risers; and
      2. a ring member positioned between said first and second containers formed with mating repeating inclined steps and generally vertical risers for raising said second container above said first container at infinite varying elevations depending upon selective relative rotational positions of said first container and said ring member thereby forming air gaps of varying length.

* * * * *

UNITED STATES PATENT AND TRADEMARK OFFICE
CERTIFICATE OF CORRECTION

PATENT NO. : 4,092,802
DATED : June 6, 1978
INVENTOR(S) : GEORGE CLEMENT OYAMA

It is certified that error appears in the above-identified patent and that said Letters Patent are hereby corrected as shown below:

In the abstract, line 3, change "method" to ---mounted---

Column 5, line 62, after "opening" insert ---in---

Signed and Sealed this

Thirty-first Day of October 1978

[SEAL]

Attest:

RUTH C. MASON
*Attesting Officer*

DONALD W. BANNER
*Commissioner of Patents and Trademarks*